United States Patent
Verbeke et al.

(10) Patent No.: US 11,760,377 B2
(45) Date of Patent: Sep. 19, 2023

(54) SHAPE-SHIFTING CONTROL SURFACE FOR AN AUTONOMOUS VEHICLE

(71) Applicant: HARMAN INTERNATIONAL INDUSTRIES, INCORPORATED, Stamford, CT (US)

(72) Inventors: Joseph Verbeke, San Francisco, CA (US); Sven Kratz, Saratoga, CA (US); Adam Boulanger, Palo Alto, CA (US); Neeka Mansourian, El Dorado Hills, CA (US); Joshua Sweers, Lansing, MI (US); Stefan Marti, Oakland, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 160 days.

(21) Appl. No.: 16/797,569

(22) Filed: Feb. 21, 2020

(65) Prior Publication Data

US 2020/0269870 A1 Aug. 27, 2020

Related U.S. Application Data

(60) Provisional application No. 62/810,931, filed on Feb. 26, 2019.

(51) Int. Cl.
*B60W 60/00* (2020.01)
*B60W 30/18* (2012.01)
*B60W 50/16* (2020.01)

(52) U.S. Cl.
CPC .......... *B60W 60/001* (2020.02); *B60W 30/18* (2013.01); *B60W 50/16* (2013.01)

(58) Field of Classification Search
CPC .......... B60W 60/001; B60W 60/0025; B60W 50/10; B60W 50/08; B60W 50/085;
(Continued)

(56) References Cited

U.S. PATENT DOCUMENTS 9,828,020 B2 11/2017 Yamada et al.
10,139,829 B1 * 11/2018 Mariet ............... G08G 1/09626
(Continued)

FOREIGN PATENT DOCUMENTS

CN 105835878 A 8/2016
CN 106467113 A 3/2017
(Continued)

OTHER PUBLICATIONS

Extended European Search Report for application No. 20159347.2 dated Aug. 3, 2020.

*Primary Examiner* — Jeff A Burke
*Assistant Examiner* — Joshua Alexander Garza
(74) *Attorney, Agent, or Firm* — Artegis Law Group, LLP

(57) ABSTRACT

A system for interactions with an autonomous vehicle includes a proprioceptive device; and a controller. The controller is configured to: detect a first condition external to the autonomous vehicle; generate a first proprioceptive output in response to the first condition, the first proprioceptive output changing a shape of the proprioceptive device; receive a first input force from the proprioceptive device; determine a first user input based on the first input force; and, based on the first user input, cause the autonomous vehicle to perform a navigation action.

20 Claims, 10 Drawing Sheets

(58) Field of Classification Search
CPC ......... B60W 2050/0063; B60W 50/04; B60W 2050/0062; B60W 30/18; B60W 50/16; B60W 10/20; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | |
|---|---|---|---|
| 10,850,693 B1* | 12/2020 | Pertsel | G06V 40/103 |
| 2012/0001742 A1* | 1/2012 | Nozoe | B60Q 9/00 |
| | | | 340/435 |
| 2014/0320432 A1 | 10/2014 | Muramatsu et al. | |
| 2015/0284008 A1* | 10/2015 | Tan | G05D 1/0231 |
| | | | 701/28 |
| 2016/0046190 A1* | 2/2016 | Kim | B60K 20/08 |
| | | | 74/473.2 |
| 2016/0347329 A1* | 12/2016 | Zelman | B60W 50/16 |
| 2017/0120930 A1* | 5/2017 | Ling | B60W 50/10 |
| 2017/0357361 A1* | 12/2017 | Hong | B60W 50/082 |
| 2018/0056867 A1* | 3/2018 | Modarres | B60W 50/16 |
| 2019/0009794 A1* | 1/2019 | Toyoda | B60W 50/12 |
| 2019/0047554 A1* | 2/2019 | Vaughn | B60W 10/20 |
| 2019/0185019 A1* | 6/2019 | Cho | B60W 60/001 |
| 2019/0227631 A1* | 7/2019 | Marti | G06F 3/0414 |
| 2019/0283780 A1* | 9/2019 | Boulanger | H04R 1/46 |
| 2019/0344797 A1* | 11/2019 | Palanisamy | B60W 30/16 |
| 2020/0139992 A1* | 5/2020 | Oba | B60W 10/20 |

FOREIGN PATENT DOCUMENTS

| | | | |
|---|---|---|---|
| CN | 107415938 A | 12/2017 | |
| DE | 102018004954 A1 * | 12/2019 | ............... B62D 1/12 |
| JP | 10-105885 A | 4/1998 | |

* cited by examiner

SHAPE-SHIFTING CONTROL SURFACE FOR AN AUTONOMOUS VEHICLE

CROSS-REFERENCE TO RELATED APPLICATIONS

This application claims priority benefit of the United States Provisional Patent Application titled, "SHAPE-SHIFTING AUTONOMOUS VEHICLE CONTROL SURFACE," filed on Feb. 26, 2019 and having Ser. No. 62/810,931. The subject matter of this related application is hereby incorporated herein by reference.

BACKGROUND

Field of the Embodiments

Embodiments of the present disclosure relate generally to autonomous vehicles and, more specifically, to a shape-shifting control surface for an autonomous vehicle.

Description of the Related Art

Autonomous vehicles, which are capable of sensing their surroundings and moving with little or no human input, are being developed with the intention of making travel safer and easier. As such, autonomous vehicles are likely to become increasingly commonplace. For example, fleets of self-driving cars may soon be employed as automated ride-hailing services, and self-driving trucks may be implemented for long-distance and other hauling services.

For level 4 and level 5 autonomous vehicles, and for level 3 autonomous vehicles engaged in autopilot, there is no need for the occupants to physically control the vehicle, and all occupants can be passengers. Such autonomous vehicles are capable of detecting what is around the vehicle and autonomously positioning the vehicle on the road according to the rules and laws of driving. As autonomous vehicles begin to be introduced, many occupants will be experienced drivers, who have their own personal driving preferences, such as modifying lane position when passing or being passed by a very large or fast-moving vehicle. Because autonomous vehicle technologies are not generally geared toward accommodating such personal driving preferences, an occupant of an autonomous vehicle who is an experienced driver may feel uncomfortable in situations in which his or her driving preferences are ignored.

For example, when passing or being passed by a truck filling most or all of an adjacent lane, an experienced driver may prefer to keep as far as possible from the truck when operating a vehicle manually. By contrast, autonomous vehicle controllers will typically optimize lane position of the vehicle between the edge of the truck and the opposite edge of the lane, which can be an uncomfortable experience for some occupants. In another example, an experienced driver may prefer to modify lane position of a manually driven vehicle when passing or being passed by a vehicle traveling at a much different speed, to give a greater margin for error on the part of either driver during the act of passing. However, an autonomous vehicle may maintain normal lane position during a passing incident. This can be psychologically uncomfortable for the experienced driver, because two vehicles with a large velocity differential are separated by a less than preferred distance during the passing incident.

In light of the above, more effective techniques for interacting with self-driving cars and other autonomous vehicles would be useful.

SUMMARY

The various embodiments set forth a system for interacting with an autonomous vehicle. The system includes a proprioceptive device and a controller. The controller is configured to: detect a first condition external to the autonomous vehicle; generate a first proprioceptive output in response to the first condition, the first proprioceptive output changing a shape of the proprioceptive device; receive a first input force from the proprioceptive device; determine a first user input based on the first input force; and, based on the first user input, cause the autonomous vehicle to perform a navigation action.

At least one advantage of the disclosed embodiments is that an occupant of an autonomous vehicle can proprioceptively receive, via a proprioceptive input/output (I/O) device, output from the autonomous vehicle that indicates a condition detected external to the autonomous vehicle. Further, the occupant can provide input to the autonomous vehicle via the proprioceptive device to cause the autonomous vehicle to perform a navigation action, such as modifying the current lane position of the autonomous vehicle. Thus, an occupant of an autonomous vehicle can receive information regarding a condition external to the autonomous vehicle without consulting a display screen, and can modify operation of the autonomous vehicle in response to the condition without visually searching for the proprioceptive I/O device. A further advantage of the disclosed embodiments is that an occupant of an autonomous vehicle can readily influence the behavior of the autonomous vehicle even though the autonomous vehicle is performing all driving and navigation functions autonomously.

BRIEF DESCRIPTION OF THE SEVERAL VIEWS OF THE DRAWINGS

So that the manner in which the above recited features of the one or more embodiments can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

For clarity, identical reference numbers have been used, where applicable, to designate identical elements that are common between figures. It is contemplated that features of one embodiment may be incorporated in other embodiments without further recitation.

DETAILED DESCRIPTION

Haptic feedback, which is the use of touch for purposes of communication, is a well-known approach for providing input to a user. Generally, output to a user that employs haptic feedback relies on touch sensors in the skin of the user to be recognized. For example, wearable computing devices and other smart devices often employ haptic feedback, such as vibration, simulated taps on the skin, and the like, to alert or otherwise communicate with a user. By contrast, embodiments described herein include outputs from an autonomous vehicle to an occupant of the autonomous vehicle via the proprioceptive sense of the user. Proprioception, also referred to as kinesthesia, is the ability of a person to sense self-movement and body position in space. Proprioception is facilitated by proprioceptors, which are the mechanosensory neurons located within muscles, tendons, and joints that are activated during movement and loading of limbs and the body. Via proprioceptive inputs, a person is aware of movement of and/or pressure against a part of the body without visually observing such movement taking place or such pressure being exerted against the body. According to various embodiments, proprioceptive inputs are employed by a proprioceptive input/output (I/O) device included in an autonomous vehicle to communicate with an occupant of the autonomous vehicle.

According to the embodiments, a bidirectional proprioceptive I/O device is configured for use in an autonomous vehicle to convey information to an occupant regarding one or more conditions external to the autonomous vehicle via the proprioceptive sense of the occupant. The bidirectional I/O device is further configured to receive input from the occupant to perform a targeted navigation action, such as modification of lane position of the autonomous vehicle. Thus, an occupant can be informed of a particular condition external to the autonomous vehicle and modify the behavior of the autonomous vehicle in response to the particular condition according to the personal preference of the occupant. For example, when a vehicle in a lane adjacent to the autonomous vehicle has closer-than-normal proximity, the occupant is informed of such a condition via the bidirectional I/O device and, in response, the occupant can indicate via the bidirectional I/O device a preferred lane position to the autonomous vehicle. The bidirectional I/O device enables both output from the autonomous vehicle and input from the user to be concurrent and co-located, making the bidirectional I/O device intuitive to use.

Figure 1:
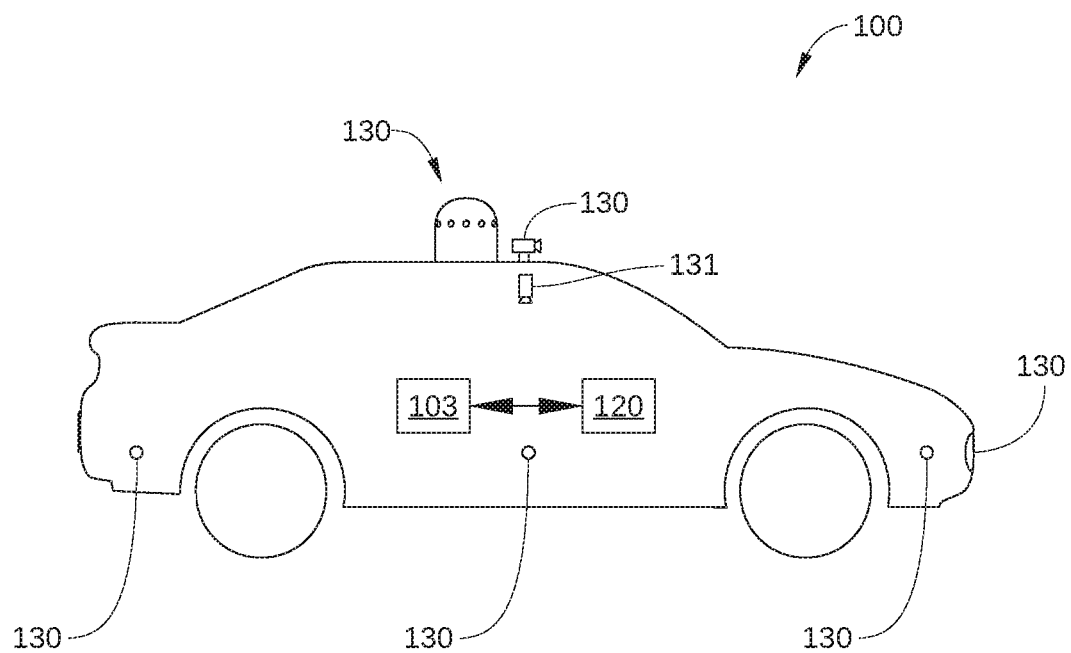
FIG. 1 is a schematic diagram illustrating an autonomous vehicle configured to implement one or more aspects of the present disclosure.

FIG. 1 is a schematic diagram illustrating an autonomous vehicle 100 configured to implement one or more aspects of the present disclosure. Autonomous vehicle 100 can be any computer-operated vehicle, such as an autonomous or self-driving car, truck, bus, and the like. In the embodiment illustrated in FIG. 1, autonomous vehicle 100 is a self-driving car that includes an autonomous vehicle control system 103. Autonomous vehicle 100 is capable of sensing the surrounding environment, both on and adjacent to the roadway, determining a suitable navigation path through the environment, and moving with little or no human input. As employed herein, a navigation path can include, without limitation, any street, roadway, driveway, parking lot automobile aisle, or other pathway suitable for travel by autonomous vehicle 100. Further, while following a navigation path, autonomous vehicle 100 is configured, via autonomous vehicle control system 103 and autonomous vehicle sensors 130, to maintain a targeted lane position and/or a targeted following distance from a vehicle preceding autonomous vehicle 100 on the navigation path. Autonomous vehicle 100 includes, without limitation, autonomous vehicle sensors 130, autonomous vehicle control system 103, and a proprioceptive I/O system 120.

Autonomous vehicle control system 103 is a computer-based system that is configured to manage the overall operation and navigation of autonomous vehicle 100. Autonomous vehicle control system 103 may include any technically feasible type of computer system, although in some embodiments, autonomous vehicle control system 103 can include one or more computing devices well-known in the art. In operation, autonomous vehicle control system 103 is configured to receive sensor data from autonomous vehicle sensors 130 and to process that data to identify a current driving action and navigation path for autonomous vehicle 101. In the context of this disclosure, a "driving action" may include turning, merging, driving through traffic, maintaining speed and lane position, caravanning with other vehicles, navigating to a specified location, and/or other actions associated with the operation of a vehicle. Autonomous vehicle control system 103 can also be configured to process the sensor data from autonomous vehicle sensors 130 to identify potentially dangerous driving conditions associated with a driving action that is currently underway.

Autonomous vehicle sensors 130 can include, without limitation, an array of different sensors configured to measure various properties associated with the environment surrounding autonomous vehicle 100, including, but not limited to, a roadway or navigation path currently occupied by autonomous vehicle 100 and/or areas adjacent to such a roadway or navigation path, such as an adjacent driving line in a multi-lane highway or freeway. Autonomous vehicle sensors 130 can include, without limitation, optical sensors (visible light or infrared), acoustic sensors (such as ultrasound sensors, active sonar, and the like), RADAR sensors, LIDAR sensors, depth sensors, stereoscopic imaging sensors, topography mapping sensors, telematic sensors, receivers, and satellite-based navigation systems, and so forth. Autonomous vehicle sensors 130 are configured to receive sensor data from a 360° panorama surrounding autonomous vehicle 100, and to transmit the sensor data to autonomous vehicle control system 103 for processing.

In some embodiments, autonomous vehicle 100 further includes one or more occupant sensors 131 for monitoring a particular body part of an occupant of autonomous vehicle 100 that interacts with a bidirectional proprioceptive I/O device. For example, occupant sensors 131 can be included in autonomous vehicle sensors 130 for sizing and/or detecting the position of the particular body part that interacts with a bidirectional proprioceptive I/O device. Such embodiments are described below in conjunction with FIG. 3.

Proprioceptive I/O system 120 is configured to generate a proprioceptive output in response to certain conditions that are detected external to autonomous vehicle 100. Examples of such conditions include, without limitation, vehicles, pedestrians, and/or obstructions detected to be near and/or around autonomous vehicle 100, such as vehicles in lanes adjacent to autonomous vehicle 100, barriers located outside but proximate to the current lane occupied by autonomous vehicle 100, static or moving objects located proximate to but out of the planned navigation path of autonomous vehicle 100, and/or vehicles detected to be moving toward autonomous vehicle 100 at a high relative speed (e.g., either within the same lane or in an adjacent lane to autonomous vehicle 100). Specifically, proprioceptive I/O system 120 changes a shape of a bidirectional proprioceptive I/O device (not shown in FIG. 1) to convey certain information to the occupant related to one or more conditions external to autonomous vehicle 100.

In some embodiments, proprioceptive I/O system 120 mechanically adjusts a surface of the bidirectional proprioceptive I/O device to physically represent the one or more conditions external to autonomous vehicle 100 using topographical features, such as bumps or raised features that press against and/or move a portion of a body part (e.g., a hand or arm) of the user. Thus, the occupant can be informed proprioceptively about certain conditions external to the vehicle. Further, proprioceptive I/O system 120 is configured to receive proprioceptive input from the occupant, for example by the exertion of a force against the one or more surfaces of the bidirectional proprioceptive I/O device by the occupant. For example, an occupant can provide proprioceptive input by pushing against, pulling on, pressing downward against, and/or swiping across a surface of the bidirectional proprioceptive I/O device. Upon receipt of such proprioceptive input from an occupant, proprioceptive I/O system 120 translates the input to a targeted behavior of autonomous vehicle 100, such as modifying lane position and/or follow distance, and provides the targeted behavior to autonomous vehicle control system 103. Thus, via proprioceptive I/O system 120, the occupant can proprioceptively provide input to autonomous vehicle 100 in response to conditions external to autonomous vehicle 100, and autonomous vehicle control system 103 can modify the behavior of autonomous vehicle 100 accordingly.

Figure 2:
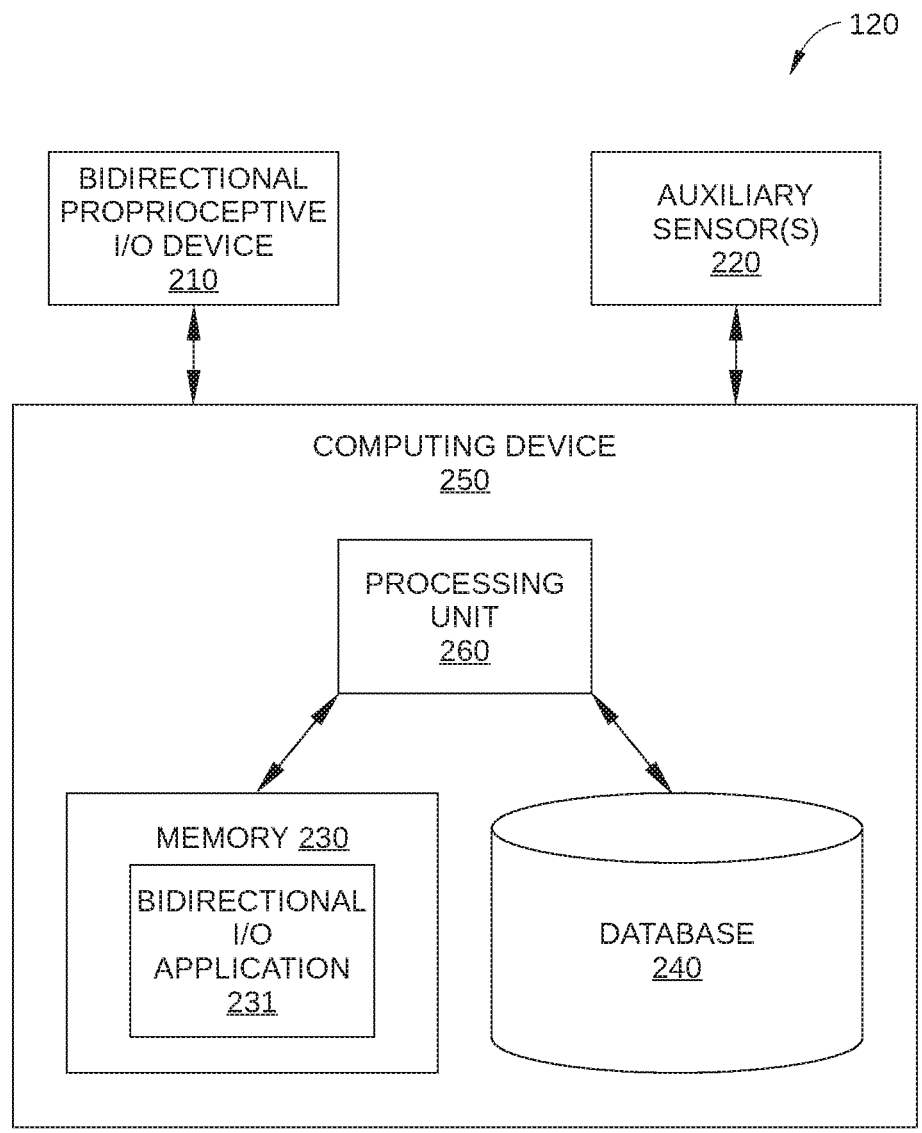
FIG. 2 is a schematic diagram of a proprioceptive system, according to one or more embodiments of the present disclosure.

FIG. 2 is a schematic diagram of proprioceptive I/O system 120, according to one or more embodiments of the present disclosure. Proprioceptive I/O system 120 includes a bidirectional proprioceptive I/O device 210, a computing device 250, and, in some embodiments, one or more auxiliary sensors 220.

Computing device 250 is configured to implement at least one aspect of the present disclosure described herein. Computing device 250 may be any type of device capable of executing application programs including instructions associated with a bidirectional I/O application 231. For example, and without limitation, computing device 250 may be an electronic tablet, a smartphone, a laptop computer, etc. Alternatively, computing device 250 may be implemented as a stand-alone chip, such as a microprocessor, or as part of a more comprehensive solution that is implemented as an application-specific integrated circuit (ASIC), a system-on-a-chip (SoC), or and so forth. Generally, computing device 250 is configured to coordinate the overall operation of proprioceptive I/O system 120. In some embodiments, computing device 250 is incorporated in or a component of another computing device-controlled system, such as autonomous vehicle control system 103 and/or an infotainment system (not shown) of autonomous vehicle 100. As shown, computing device 250 includes, without limitation, a processing unit 260, a memory 230, and a database 240.

In the embodiment illustrated in FIG. 2, computing device 250 is shown as a single integrated device. In other embodiments, some or all of the functionality of computing device 250 described herein can be implemented as multiple computing devices, such as a computing device integrated into bidirectional proprioceptive I/O device 210 and another computing device integrated into autonomous vehicle control system 103.

Processing unit 260 may be implemented as a central processing unit (CPU), a graphics processing unit (GPU), an ASIC, a field programmable gate array (FPGA), a tensor processing unit (TPU), and/or any other type of processing unit, or a combination of different processing units. In general, processing unit 260 may be any technically feasible hardware unit capable of processing data and/or executing software applications to facilitate operation of proprioceptive I/O system 120 of FIG. 1, as described herein. Processing unit 260 may be physically embedded in computing device 250, may be part of a cloud-based computing environment, and/or may be part of a computing device external to proprioceptive I/O system 120, such as a mobile computing device or a wearable computing device. In some embodiments, processing unit 260 is an element of an in-vehicle infotainment system (not shown) included in autonomous vehicle 100, or is an element of autonomous vehicle control system 103 of autonomous vehicle 100. Generally, processing unit 260 is configured to execute instructions associated with at least bidirectional I/O application 231.

Memory 230 may include a random access memory (RAM) module, a flash memory unit, or any other type of memory unit or combination thereof, and may include a single memory module or a collection of memory modules. As shown, in some embodiments, some or all of bidirectional I/O application 231 may reside in memory 230 during operation. Database 240 can include any suitable non-volatile data storage device, such as an electrically erasable programmable read-only memory (EEPROM), a hard disk drive, etc. In some embodiments, database 240 stores user-specific information, such as information associated with certain driving preferences of particular users of autonomous vehicle 100.

Bidirectional proprioceptive I/O device 210 is configured to generate proprioceptive output for an occupant of autonomous vehicle 100. Thus, according to various embodiments, bidirectional proprioceptive I/O device 210 includes one or more interaction surfaces that are each configured to contact a respective portion of a body part of a particular occupant by changing shape. Bidirectional proprioceptive I/O device 210 is further configured to receive proprioceptive input from the occupant via the one or more interaction surfaces. One such embodiment of bidirectional proprioceptive I/O device 210 is illustrated in FIG. 3.

Figure 3:
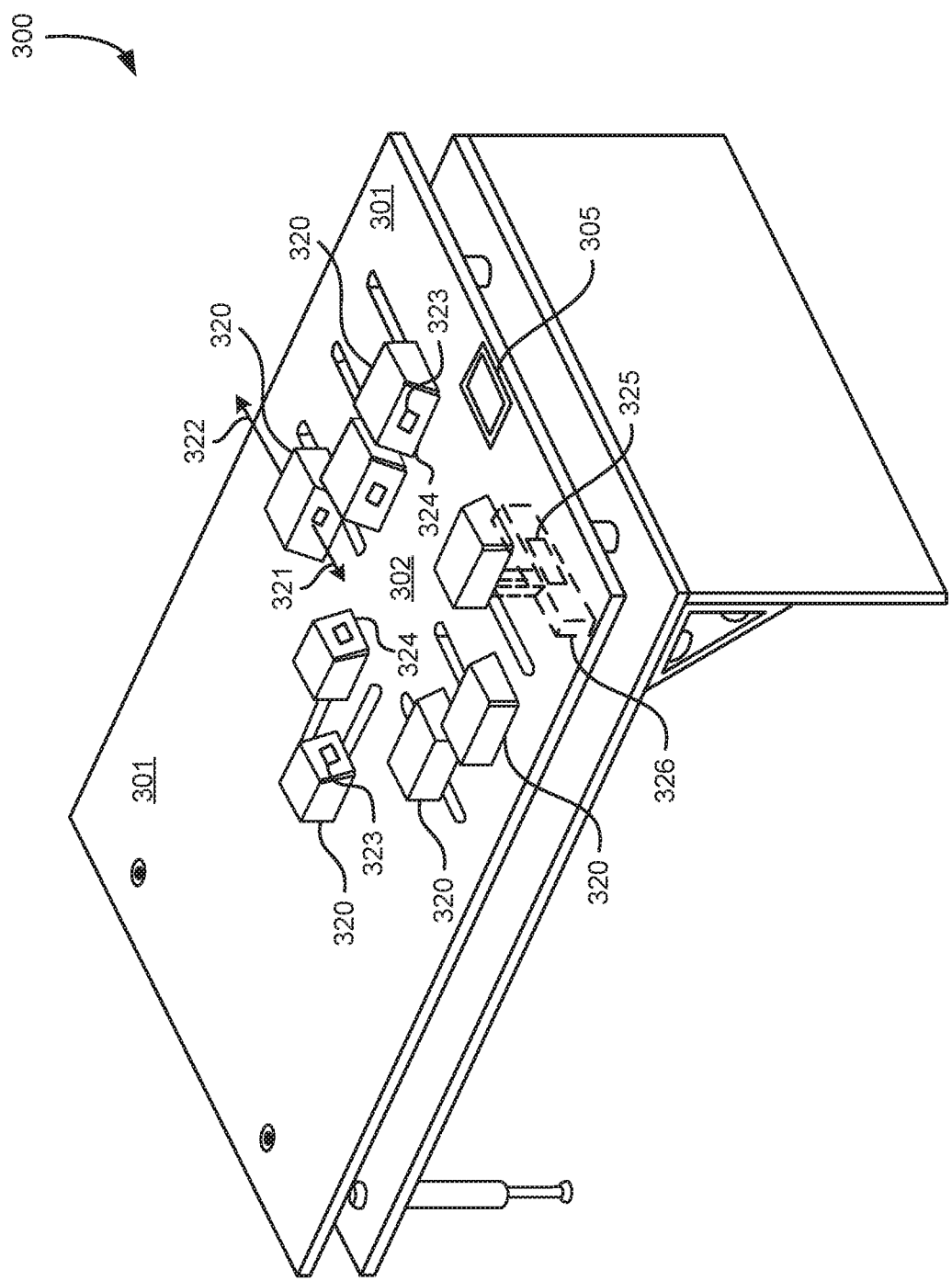
FIG. 3 is a perspective view of a slider-based proprioceptive I/O device, according to an embodiment of the present disclosure.

FIG. 3 is a perspective view of a slider-based proprioceptive I/O device 300, according to an embodiment of the present disclosure. As shown, slider-based proprioceptive I/O device 300 includes a surface 301 configured with a receiving surface 302 to support or otherwise receive a particular body part of an occupant of autonomous vehicle 100, such as a hand or forearm. In some examples, surface 301 may be oriented in a substantially horizontal manner. Alternatively, surface 301 may be tilted, angled upward or downward, substantially vertical in orientation (e.g., when mounted on a side surface of an autonomous vehicle), and the like. Slider-based proprioceptive I/O device 300 further includes multiple slider mechanisms 320 disposed around surface 301, which are movable elements configured to generate proprioceptive output. In the embodiment illustrated in FIG. 3, a group of three slider mechanisms 320 is arranged on a left side of receiving surface 302 and another group of three slider mechanisms 320 is arranged on a right side of receiving surface 302. In other embodiments, more or fewer slider mechanisms 320 are arranged in the group of slider mechanisms 320 to the left and in the group of slider mechanisms 320 to the right of receiving surface 302. Further, in some embodiments, slider mechanisms 320 are enclosed within a flexible covering (not shown) that forms a continuous surface that changes shape as slider mechanisms 320 actuate during use.

Each slider mechanism 320 is configured to move along surface 301 in a first direction 321 toward receiving surface 302 and in a second direction 322 away from receiving surface 302. Generally, one or more of slider mechanisms 320 can move, exert force against, and/or move away from a body part of the occupant resting on receiving surface 302 in response to certain conditions being detected external to autonomous vehicle 100. Thus, information related to the one or more conditions external to autonomous vehicle 100 can be conveyed to the occupant of autonomous vehicle 100 whose body part is resting on receiving surface 302 (hereinafter referred to as the "occupant of autonomous vehicle 100").

Each slider mechanism 320 is further configured to receive proprioceptive input from the occupant of autonomous vehicle 100 whose body part is resting on receiving surface 302. In some embodiments, each slider mechanism 320 includes a pressure sensor 323 disposed on a contact surface 324 of the slider mechanism 320 to measure an input pressure exerted thereon by a portion of the body part of the occupant. In some instances, the pressure exerted on one or more pressure sensors 320 is caused by an occupant generating the input pressure, while in other instances, the pressure exerted on one or more pressure sensors 320 is caused by opposition to actuation of one or more slider mechanisms 320 when generating proprioceptive output. Alternatively or additionally, in some embodiments, the input pressure exerted on a slider mechanism 320 is measured within the slider mechanism 320, for example via a strain gauge or pressure sensor 325 coupled to or included in a drive mechanism 326 of the horizontal slider mechanism 320. For clarity, only one instance of pressure sensor 325 and drive mechanism 326 is illustrated in FIG. 3.

In some embodiments, slider-based proprioceptive I/O device 300 further includes a body part detection device 305. In such embodiments, body part detection device 305 enables detection of the presence of an occupant body part, such as a hand or forearm, on receiving surface 302. Body part detection device 305 can include any technically feasible detection device, including an optical and/or capacitive sensing device. In some embodiments, autonomous vehicle 100 includes one or more occupant sensors 131 (shown in FIG. 1) for monitoring a particular body part of an occupant of autonomous vehicle 100 that interacts with slider-based proprioceptive I/O device 300. In such embodiments, the one or more occupant sensors 131 enable sizing and/or detection of the position of the particular body part that interacts with slider-based proprioceptive I/O device 300. In such embodiments, the neutral positions of slider mechanisms 320 can be determined for any given user, where the neutral positions of slider mechanisms 320 are the positions thereof when no proprioceptive I/O is taking place.

In operation, slider-based proprioceptive I/O device 300 conveys information related to one or more conditions external to autonomous vehicle 100 by changing shape and contacting one or more portions of an occupant body part resting on receiving surface 302. In some embodiments, such information is conveyed based on the convention that the occupant body part resting on receiving surface 302 (e.g., a hand) represents autonomous vehicle 100. In such embodiments, proprioceptive output from slider-based proprioceptive I/O device 300 represents the presence of a condition that has been detected in the surroundings of autonomous vehicle 100 that can conflict with or otherwise affect the driving preferences of the occupant. For example, in one such embodiment, the presence of an object or obstruction that lies outside the current navigation path of autonomous vehicle 100 is detected by autonomous vehicle control system 103, thus, autonomous vehicle 100 is generally configured to drive past the object or obstruction with little or no change to the current position of autonomous vehicle 100 within the current navigation path. In the embodiment, when the proximity of the object or obstruction to autonomous vehicle 100 is determined to potentially violate the driving preferences of the occupant, slider-based proprioceptive I/O device 300 represents the approximate location of the object or obstruction by pressure on and/or movement of a portion of the occupant body part using one or more of slider mechanisms 320. Specifically, the portion of the occupant body part corresponding to the portion of autonomous vehicle 100 that is located closest to the object or obstruction has the pressure exerted thereon and/or is caused to move due to the proprioceptive output from slider-based proprioceptive I/O device 300. Examples are illustrated in FIGS. 4A-4D.

FIGS. 4A-4D illustrate proprioceptive output from and proprioceptive input to slider-based proprioceptive I/O device 300 over time in response to conditions external to an autonomous vehicle 400, according to an embodiment of the present disclosure. FIGS. 4A-4D illustrate further illustrate the position of autonomous vehicle 400 over time relative to the conditions external thereto.

Figure 4A:
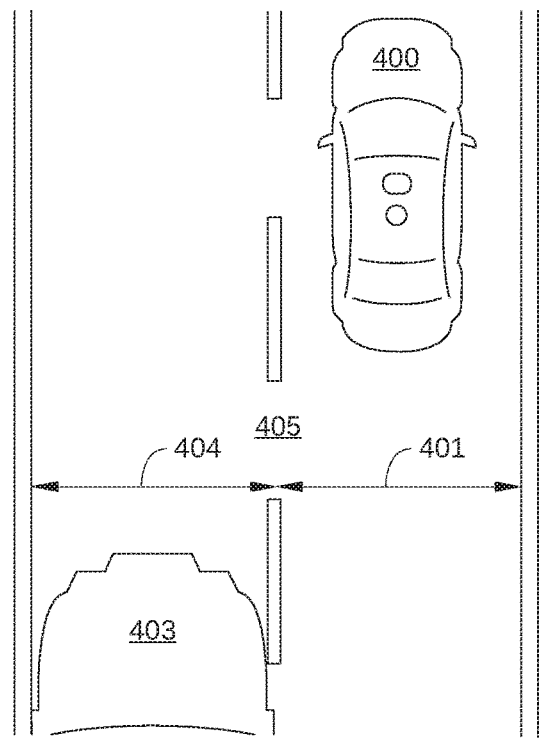
FIGS. 4A-4D illustrate proprioceptive output from and proprioceptive input to the slider-based proprioceptive I/O device of FIG. 3 over time in response to conditions external to an autonomous vehicle, according to an embodiment of the present disclosure.
Figure 4A:
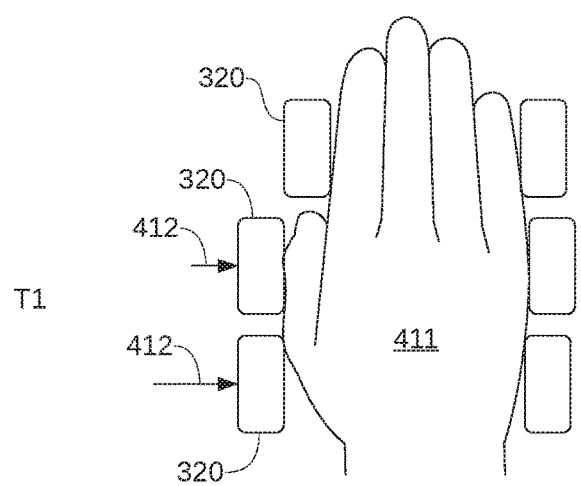

FIG. 4A schematically illustrates autonomous vehicle 400 driving in a right-hand lane 401 of a roadway 402 prior to being passed by a wide vehicle 403 in a left-hand lane 404 of roadway 405 at a time T1. FIG. 4A also schematically illustrates slider-based proprioceptive I/O device 300 at time T1 and an occupant hand 411, which is a hand of an occupant of autonomous vehicle 400. Because wide vehicle 403 does not extend into right-hand lane 401, a conventional control system of autonomous vehicle 400 may not modify the lane position of autonomous vehicle 400 while wide vehicle 403 passes. However, according to various embodiments, slider-based proprioceptive I/O device 300 provides proprioceptive output 412 via one or more slider mechanisms 320 in the left-rear region of slider-based proprioceptive I/O device 300. The proprioceptive output 412 can include inward movement of one or more slider mechanisms 320 as shown. Alternatively or additionally, the proprioceptive output 412 can include inward pressure against portions of occupant hand 411 by one or more slider mechanisms 320. In the embodiment illustrated in FIG. 4A, a different proprioceptive output 412 is generated by different slider mechanisms 320. In other embodiments, proprioceptive output 412 can be uniform among the multiple slider mechanisms 320 that are generating proprioceptive output 412. In yet other embodiments, proprioceptive output 412 generated by each different slider mechanism 320 can vary over time. For example, as wide vehicle 403 passes autonomous vehicle 400, a wave-like effect can be felt by the occupant as the location of wide vehicle 403 relative to autonomous vehicle 400 is tracked by the slider mechanisms 320 on the left side of slider-based proprioceptive I/O device 300.

In generating proprioceptive output 412, slider-based proprioceptive I/O device 300 alerts the occupant to a condition external to autonomous vehicle 400 that may violate a driver preference of the occupant, i.e., the close proximity of a passing vehicle to autonomous vehicle 400. As a result, the occupant is made aware of the condition, and can direct autonomous vehicle control system 103 via slider-based proprioceptive I/O device 300 to modify the driving behavior of autonomous vehicle 400, as illustrated in FIG. 4B.

Figure 4B:
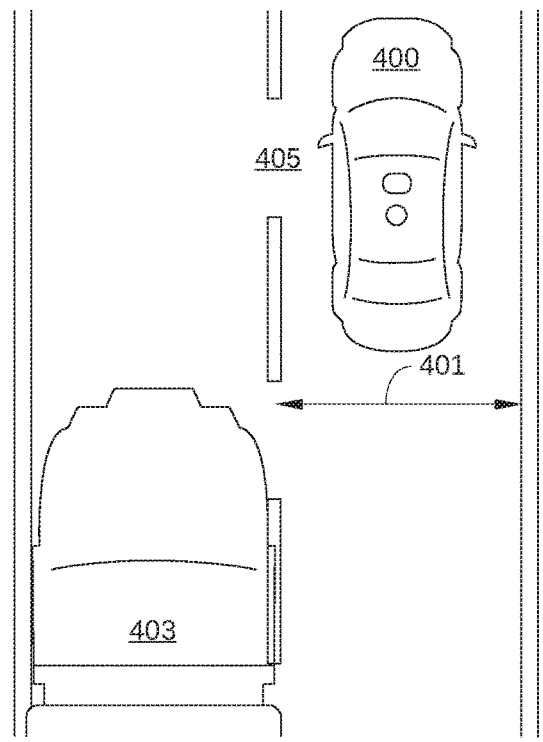
Figure 4B:
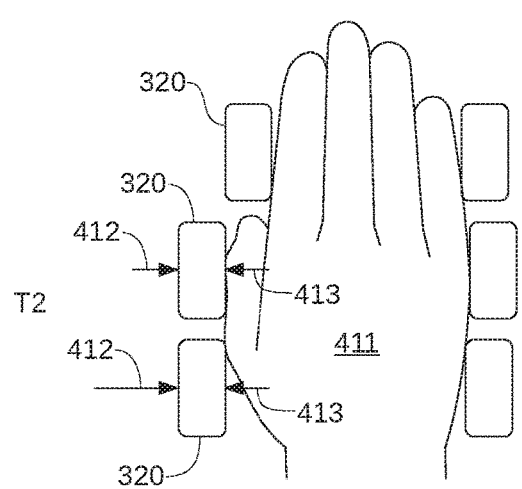

FIG. 4B schematically illustrates autonomous vehicle 400, slider-based proprioceptive I/O device 300, and occupant hand 411 at a time T2. As shown, at time T2, wide vehicle 403 has not yet passed autonomous vehicle 400. In addition, the occupant has provided proprioceptive input 413 via slider-based proprioceptive I/O device 300, requesting that autonomous vehicle 400 navigate to a far edge of right-hand lane 401.

In the embodiment illustrated in FIG. 4B, proprioceptive input 413 includes a motion and/or pressure from occupant hand 411 against one or more of slider mechanisms 320 in a portion of slider-based proprioceptive I/O device 300 that corresponds to the condition external to autonomous vehicle 400, i.e., wide vehicle 403. Thus, in the embodiment shown, the occupant pushes away from the perceived hazard or other condition, and autonomous vehicle 400 subsequently navigates away from the perceived hazard or other condition. In other embodiments, a different control paradigm may be employed. For example, in one such embodiment, a downward pressure onto a specific portion of the receiving surface of slider-based proprioceptive I/O device 300 indicates a requested direction in which to modify the lane position of autonomous vehicle 400. Thus, in one such embodiment, downward pressure on a right-hand region of slider-based proprioceptive I/O device 300 instructs autonomous vehicle 400 to move to the right-hand portion of right-hand lane 401, while downward pressure on a left-hand region of slider-based proprioceptive I/O device 300 instructs autonomous vehicle 400 to move to the left-hand portion of right-hand lane 401. In another such embodiment, navigation of autonomous vehicle 400 in a targeted direction is indicated by the occupant by moving the body part in the targeted direction. Thus, in such the instance illustrated in FIG. 4B, the occupant the body part to the right, indicating a request for navigation of autonomous vehicle 400 to the right-hand edge of right-hand lane 401. In other embodiments, any other technically feasible control paradigm can be employed to indicate a preferred direction in which to modify navigation of autonomous vehicle 400.

Figure 4C:
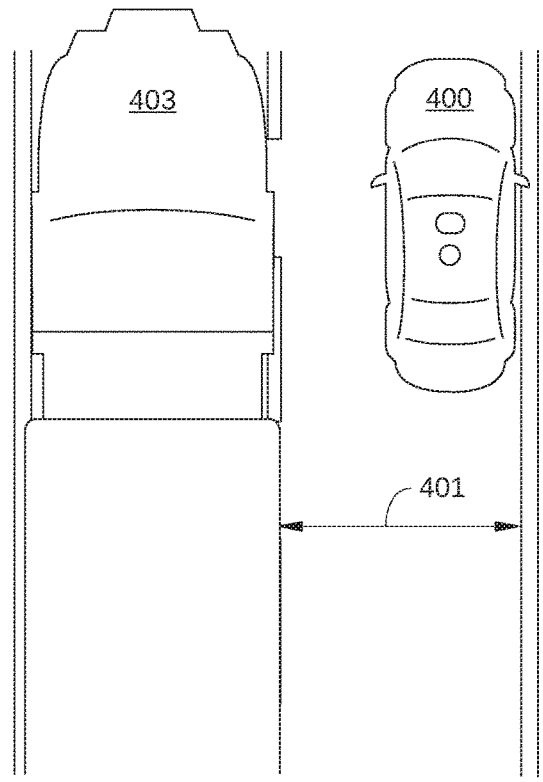
Figure 4C:
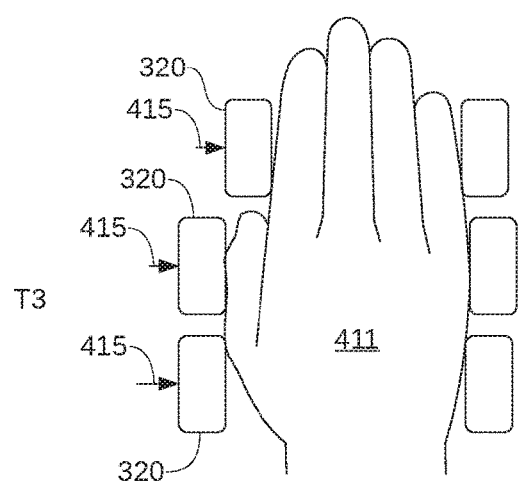

FIG. 4C schematically illustrates autonomous vehicle 400, slider-based proprioceptive I/O device 300, and occupant hand 411 at a time T3. As shown, at time T3, wide vehicle 403 is passing autonomous vehicle 400. In addition, because the occupant requested autonomous vehicle 400 to move to the right-hand edge of right-hand lane 401, via slider-based proprioceptive I/O device 300, autonomous vehicle 400 has navigated to a far edge of right-hand lane 401 while wide vehicle 403 passes autonomous vehicle 400. In so doing, autonomous vehicle 400 has responded to the proprioceptive input received from the occupant and has navigated autonomous vehicle 400 to a preferred lane position away from the perceived hazard of wide vehicle 403. In addition, because autonomous vehicle 400 is in the right-hand portion of right-hand lane 401 and is positioned away from wide vehicle 403, slider-based proprioceptive I/O device 300 provides additional proprioceptive output 415 indicating that autonomous vehicle 400 has been positioned to be away from the detected condition. As shown, proprioceptive output 415 is provided by slider-based proprioceptive I/O device 300 by horizontally moving one or more horizontal slider mechanisms 320 to indicate that the perceived hazard is not as proximate as at time T1, because there is now greater left-to-right spacing between autonomous vehicle 400 and wide vehicle 403.

Figure 4D:
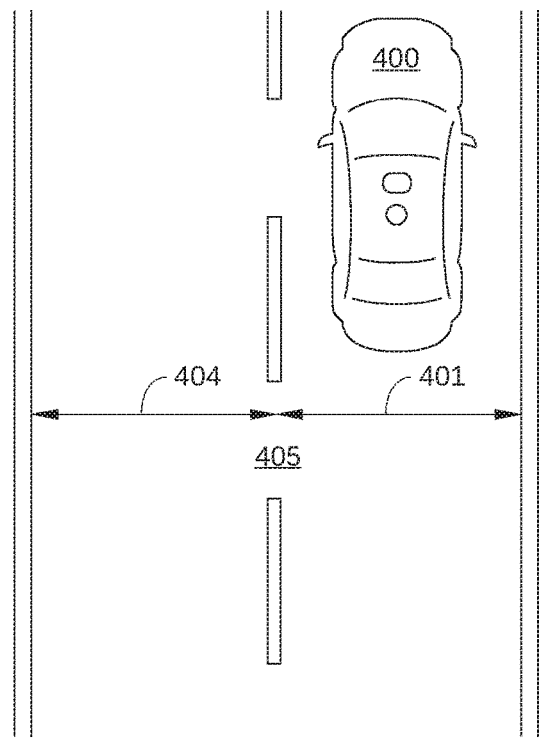
Figure 4D:
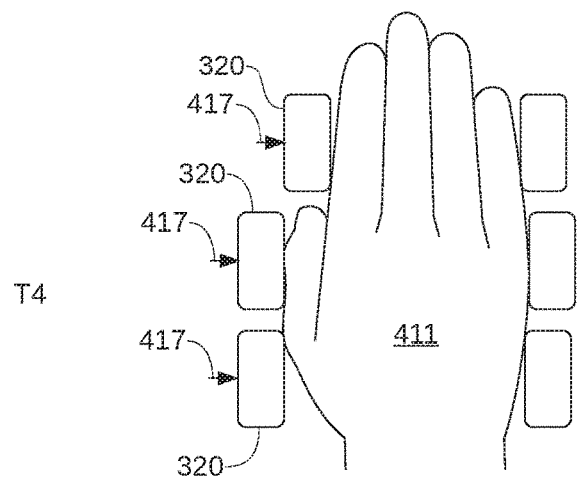

FIG. 4D schematically illustrates autonomous vehicle 400, slider-based proprioceptive I/O device 300, and occupant hand 411 at a time T4. As shown, at time T4, wide vehicle 403 has passed autonomous vehicle 400, which has repositioned itself in a center portion of right-hand lane 401. Further, because autonomous vehicle 400 detects no perceived hazard proximate the current navigation path of autonomous vehicle 400, neutral proprioceptive input 416 is provided to occupant hand 411, in which equal or no pressure against and/or movement of occupant hand 411 is caused by slider-based proprioceptive I/O device 300.

In the embodiment illustrated in FIGS. 4A-4D, the driving preference depicted is lane position relative to large vehicles in an adjacent lane and/or lane position relative to vehicles in an adjacent lane having a high speed relative to autonomous vehicle 400. Another example of a driving preference that can be indicated by an occupant may be lane position relative to objects proximate the current lane of autonomous vehicle 400, such as concrete barriers and/or guard rails. Another example of such a driving preference may be modification of location in a lane relative to vehicles in an adjacent lane that have little or no relative speed with respect to autonomous vehicle 400. For example, pushing forward on movable elements of a proprioceptive I/O device can indicate a request to decelerate autonomous vehicle 400 such that autonomous vehicle 400 is not positioned side-by-side with another vehicle for an extended period of time, while pushing backward on movable elements of a proprioceptive I/O device can indicate a request to accelerate autonomous vehicle 400 so that autonomous vehicle 400 is not positioned side-by-side with the other vehicle. Yet another example of such a driving preference may be pulling or pushing one or more movable elements of a proprioceptive device backward to decrease "aggressiveness" of the operation of autonomous vehicle 400. For example, an occupant may employ such proprioceptive input when autonomous vehicle 400 appears to be entering an on-ramp too quickly for the comfort of the occupant.

Figure 5:
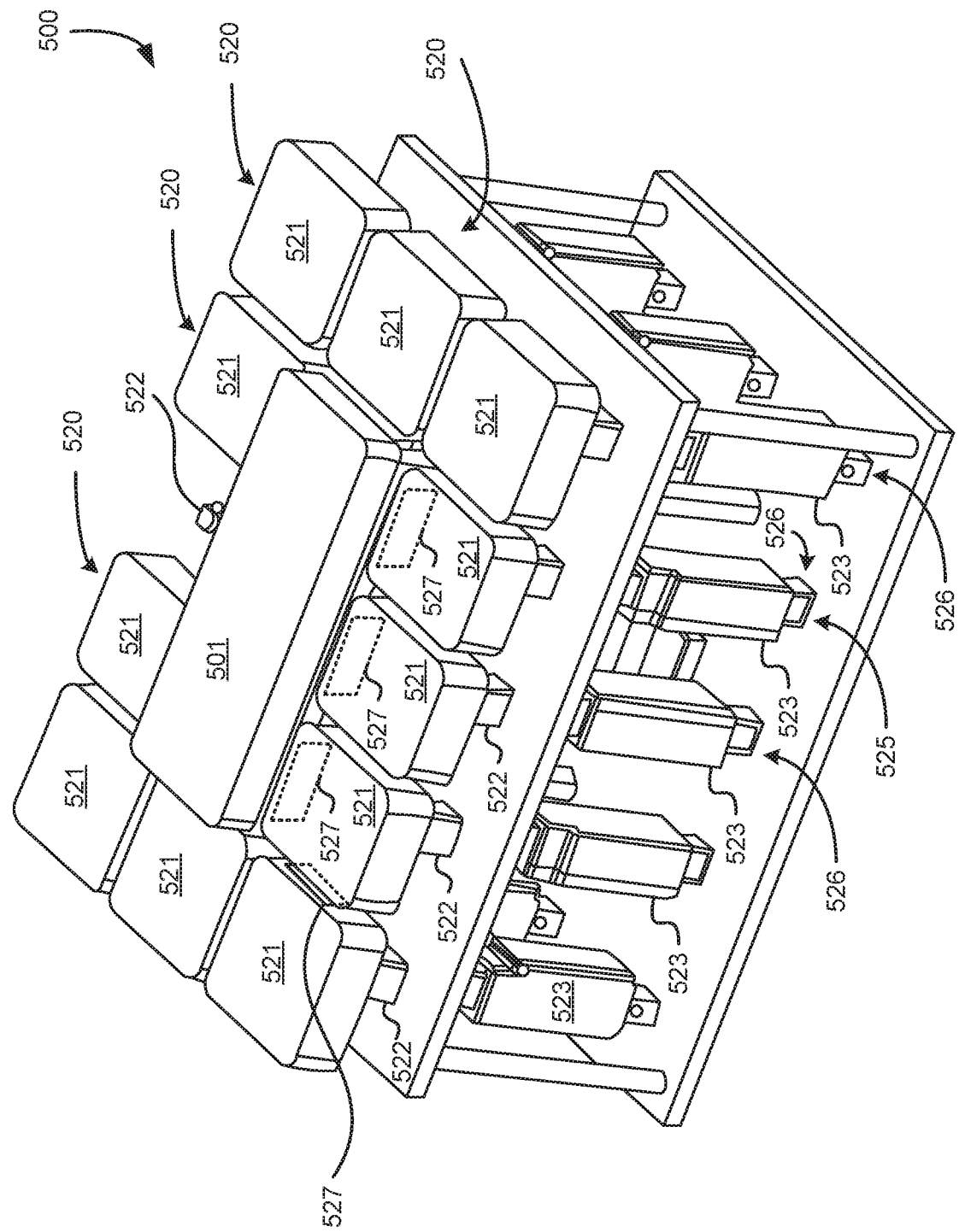
FIG. 5 schematically illustrates a piston-based proprioceptive I/O device, according to an embodiment of the present disclosure.

FIG. 5 schematically illustrates a piston-based proprioceptive I/O device 500, according to an embodiment of the present disclosure. Piston-based proprioceptive I/O device 500 includes a base 501 for supporting a particular body part of an occupant and a plurality of movable pistons 520 disposed around base 501, which are movable elements configured to generate proprioceptive output. Each movable piston 520 includes a cushion 521 that is coupled via a shaft 522 to a respective actuator 523. In FIG. 5, a cushion 521 of one of movable pistons 520 is removed so that the associated shaft 522 is visible.

In the embodiment illustrated in FIG. 5, piston-based proprioceptive I/O device 500 includes 12 movable pistons 520, but in other embodiments, piston-based proprioceptive I/O device 500 includes more or fewer movable pistons 520. Further, in some embodiments, movable pistons 520 are enclosed with a flexible covering (not shown) that forms a continuous surface that changes shape as movable pistons 520 actuate during use.

In some embodiments, proprioceptive output is generated via selective motion of movable pistons 520. Thus, rather than pressing and/or moving a portion of an occupant hand inward to convey information regarding a condition external to an autonomous vehicle, movable pistons 520 push and/or move a portion of the occupant hand away from base 501. In such embodiments, piston-based proprioceptive I/O device 500 receives proprioceptive input from an occupant hand (not shown) resting on base 501 through pressure from the occupant hand against or side-to-side relative to one or more of movable pistons 520.

Pressure against a particular movable piston 520 can be measured by, for example, a pressure sensor (not shown for clarity) disposed on the cushion of the movable piston 520. Sideways pressure against a particular movable piston 520 can be measured by, for example, a sensor 525 coupled to an outward-rotating hinge 526 of the movable piston 520. In such embodiments, sideways pressure against the cushion 521 of a particular movable piston 520 causes the movable piston 520 to rotate outward, i.e., away from base 501, and such outward rotation is detected by the sensor 525 coupled to the outward-rotating hinge 526 that is actuated under the sideways pressure. Sensor 525 can be a strain gauge, pressure sensor, rotational position sensor, or any other suitable sensor that can be coupled to outward-rotating hinge 526. Alternatively or additionally, in some embodiments, sideways pressure against the particular movable piston 520 can be measured by, for example, a pressure sensor 527 disposed on a side edge of the cushion 521 of that particular movable piston 520.

In the embodiment illustrated in FIG. 5, piston-based proprioceptive I/O device 500 includes movable pistons 520 on four sides of base 501. Consequently, proprioceptive output from piston-based proprioceptive I/O device 500 can be provided to an occupant for a condition external to an autonomous vehicle that is detected in any surrounding position: in front of the autonomous vehicle, behind the autonomous vehicle, on the left side of the autonomous vehicle, on the right rear of the autonomous vehicle, etc. Similarly, proprioceptive input can be received by piston-based proprioceptive I/O device 500 from the occupant that indicates motion toward or away from any such position. Thus, in an instance in which an autonomous vehicle detects a condition external to the autonomous vehicle that is directly behind the autonomous vehicle, piston-based proprioceptive I/O device 500 can move some or all of movable pistons 520 that contact a rear portion of the occupant hand resting on base 501. Further, in response, the occupant can provide proprioceptive input that indicates a request for navigation away from the condition by pressing the hand against the movable pistons 520 that contact the rear portion of the hand. Alternatively or additionally, in some embodiments, the occupant can provide such proprioceptive input by pressing backward with the rear portion of the hand sideways relative to the movable pistons 520 that contact the rear portion of the hand. As with the embodiment described above in conjunction with FIG. 3, as the condition is detected to be farther from the autonomous vehicle, the movable pistons 520 generating proprioceptive output associated with the condition may move to a less extended position to indicate such a change in the condition.

Figure 6:
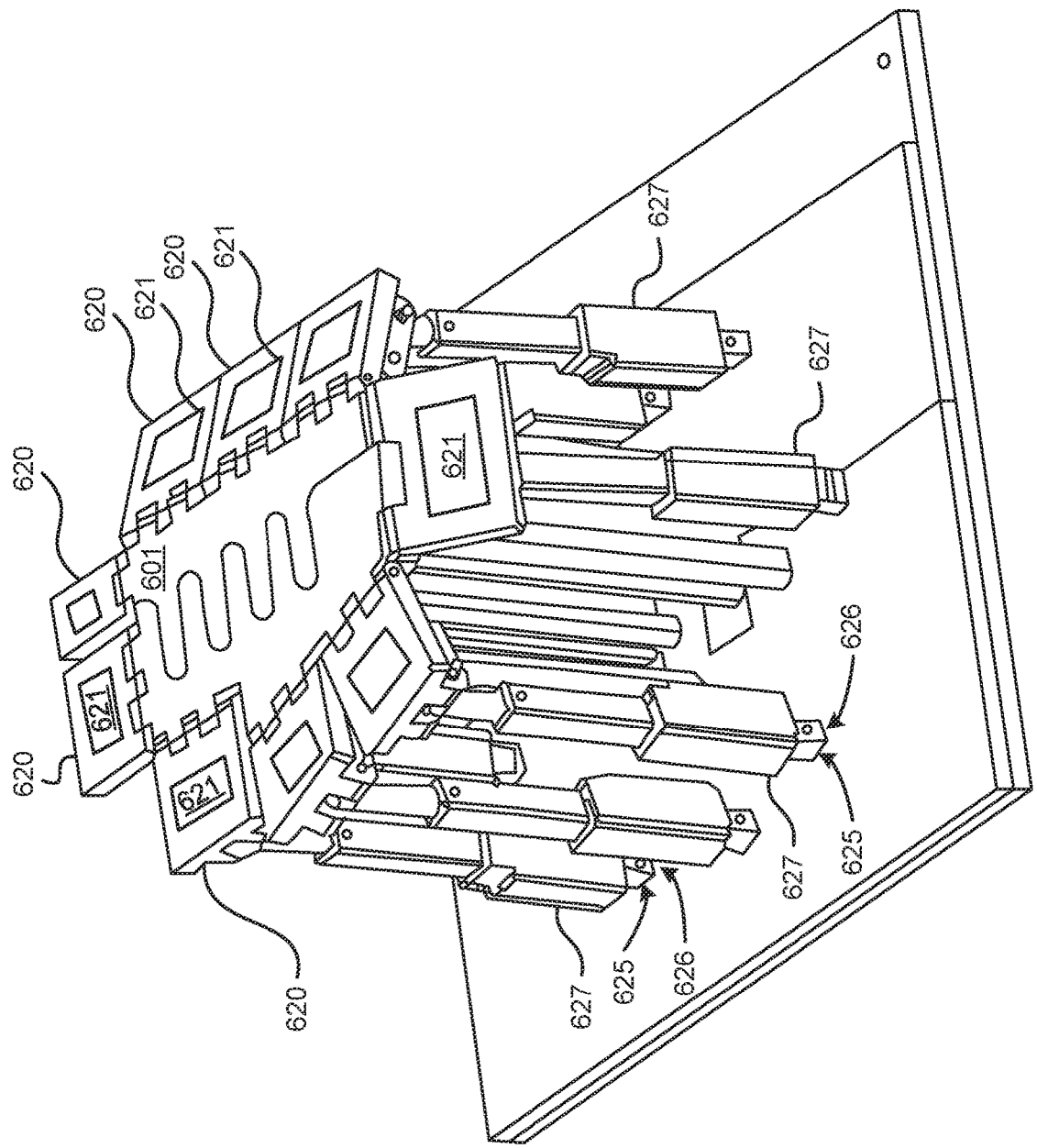
FIG. 6 schematically illustrates a flap-based proprioceptive I/O device, according to an embodiment of the present disclosure.

FIG. 6 schematically illustrates a flap-based proprioceptive I/O device 600, according to an embodiment of the present disclosure. Flap-based proprioceptive I/O device 600 includes a base 601 for supporting a particular body part of an occupant and a plurality of rotatable flaps 620 disposed around base 601, which are movable elements configured to generate proprioceptive output. Each rotatable flap 620 includes a contact surface 621 configured to generate proprioceptive output by moving and/or exerting pressure against a different portion of an occupant body part, such as a hand.

In the embodiment illustrated in FIG. 6, flap-based proprioceptive I/O device 600 includes nine rotatable flaps 620, but in other embodiments, flap-based proprioceptive I/O device 600 includes more or fewer rotatable flaps 620. Further, in some embodiments, rotatable flaps 620 are enclosed with a flexible covering (not shown) that forms a continuous surface that changes shape as rotatable flaps 620 actuate during use.

In some embodiments, proprioceptive input is received by flap-based proprioceptive I/O device 600 via pressure and/or movement of rotatable flaps 620 caused by the occupant hand. In such embodiments, flap-based proprioceptive I/O device 600 receives proprioceptive input from an occupant hand (not shown) resting on base 601 via a pressure sensor on each contact surface 621 and/or a sensor 625 coupled to each rotating hinge 626 of a rotatable flap actuator 627. Sensor 625 can be a strain gauge, pressure sensor, rotational position sensor, or any other suitable sensor that can be coupled to rotating hinge 626.

Similar to the embodiment illustrated in FIG. 5, the embodiment illustrated in FIG. 6 is configured to generate proprioceptive output to an occupant for a condition external to an autonomous vehicle that is detected in any surrounding position. Similarly, proprioceptive input can be received by flap-based proprioceptive I/O device 600 from the occupant that indicates motion toward or away from any such position.

Figure 7:
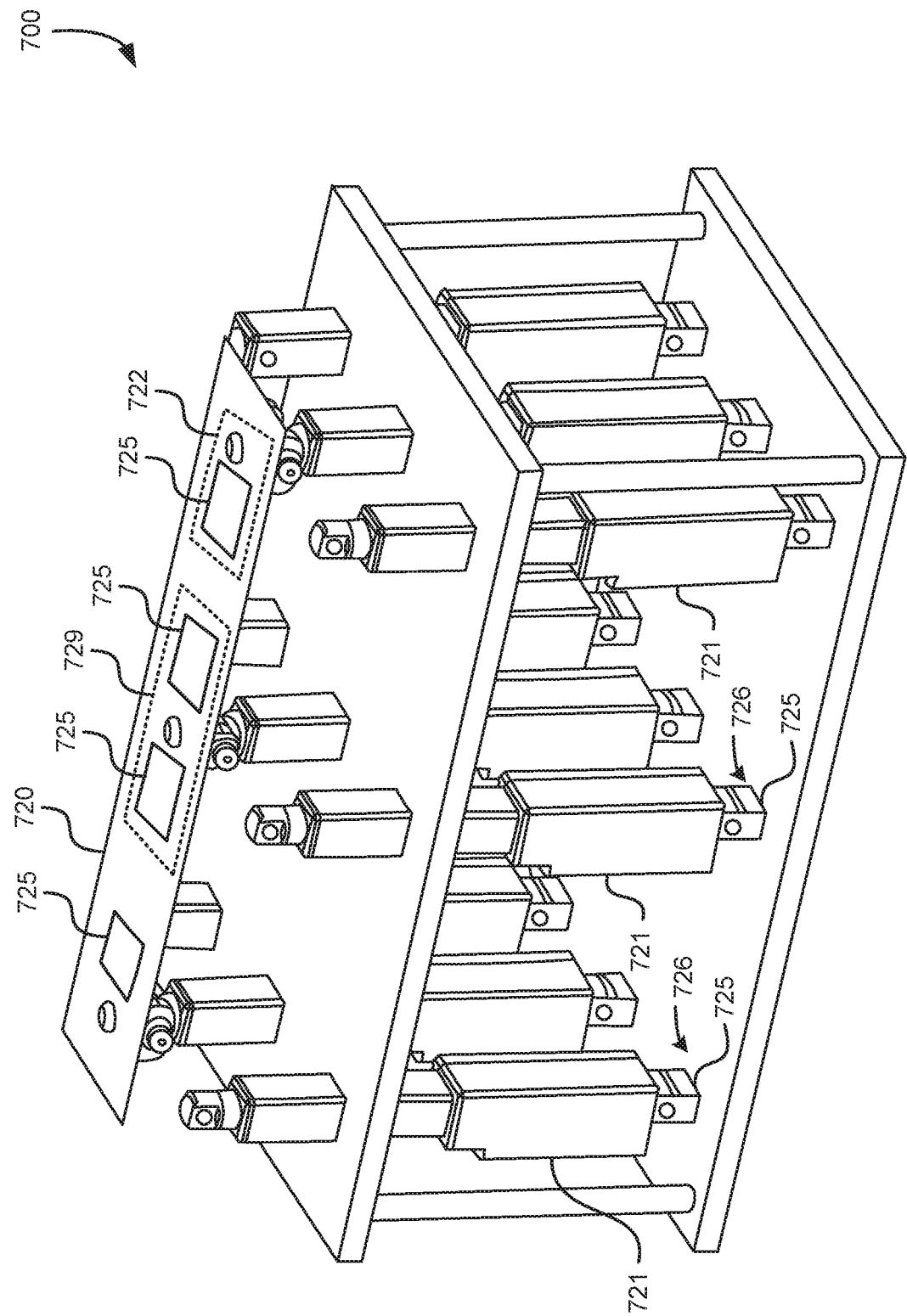
FIG. 7 schematically illustrates a proprioceptive I/O device that includes multiple flexible surfaces, according to an embodiment of the present disclosure.

FIG. 7 schematically illustrates a proprioceptive I/O device 700 that includes multiple flexible surfaces, according to an embodiment of the present disclosure. Proprioceptive I/O device 700 does not include a central base for supporting a particular body part of an occupant. Instead, proprioceptive I/O device 700 includes three or more flexible strips 720 that are each configured to be changed in shape by multiple actuators 721, such as pistons or other actuators. In the embodiment illustrated in FIG. 7, proprioceptive I/O device 700 is configured with three flexible strips 720, two of which are omitted for clarity. Similar to the above-described embodiments, flexible strips 720 are movable elements that are configured to generate proprioceptive output.

Proprioceptive I/O device 700 is configured for an occupant hand (or other suitable body part in other embodiments) to rest on a central portion 729 of a middle flexible strip 720. In response to an autonomous vehicle detecting a condition external to the autonomous vehicle that may impact a driver preference or other preference of the occupant, proprioceptive I/O device 700 changes the position of one or more portions of some or all of flexible strips 720. In some embodiments, proprioceptive I/O device 700 includes more than three flexible strips 720. Further, in some embodiments, flexible strips 720 are enclosed with a flexible covering (not shown) that forms a continuous surface that changes shape as flexible strips 720 actuate during use.

In some embodiments, the amount of movement of a portion of a flexible strip 720 corresponds to an attribute of the detected condition, such as proximity, relative speed, etc. For example, in some embodiments, when another vehicle approaches an autonomous vehicle at a high velocity from behind, proprioceptive I/O device 700 causes a rear portion 722 of one or more of flexible strips 720 to be moved closer to the hand of the occupant relative to the other flexible strips 720. Further, in one such embodiment, the flexible strip (or strips) 720 that correspond to the specific lane of the approaching vehicle are moved toward the hand, while the flexible strips 720 that correspond to other lanes are not. Thus, the occupant is proprioceptively informed of the condition (e.g., a fast-moving vehicle is approaching), the location of the condition (e.g., left lane and to the rear, same lane and to the rear, etc.), and the magnitude of the condition (e.g., more movement for higher speed velocity). Specifically, proprioceptive I/O device 700 moves and/or exerts pressure against a different portion of an occupant body part, such as a hand, to provide such information associated with the condition.

In some embodiments, proprioceptive I/O device 700 is further configured to receive proprioceptive input via pressure and/or movement of flexible strips 720 caused by the occupant hand. In such embodiments, proprioceptive I/O device 700 receives proprioceptive input from an occupant hand (not shown) resting on central portion 701 via one or more pressure sensors 725 on each flexible strip 720 and/or a sensor 725 coupled to each rotating hinge 726 of a flexible strip actuator 721. Sensor 725 can be a strain gauge, pressure sensor, rotational position sensor, or any other suitable sensor that can be coupled to each rotating hinge 726. Thus, sensor 725 can measure pressure and/or movement caused by an occupant pressing against an edge of a flexible strip 720. In some embodiments, measuring pressure on the edge of flexible strip 720 is performed in lieu of the measurement of downward pressure on one or more pressure sensors 725 of a flexible strip 720. In other embodiments, measuring pressure on the edge of flexible strip 720 is performed in addition to the measurement of pressure on one or more pressure sensors 725 of a flexible strip 720. In either case, an occupant can generate proprioceptive input indicating navigation of an autonomous vehicle away from a condition to the left or right of the autonomous vehicle by pushing sideways against one or more flexible strips 720 on the side of proprioceptive I/O device 700 corresponding to the position of the condition.

Figure 8:
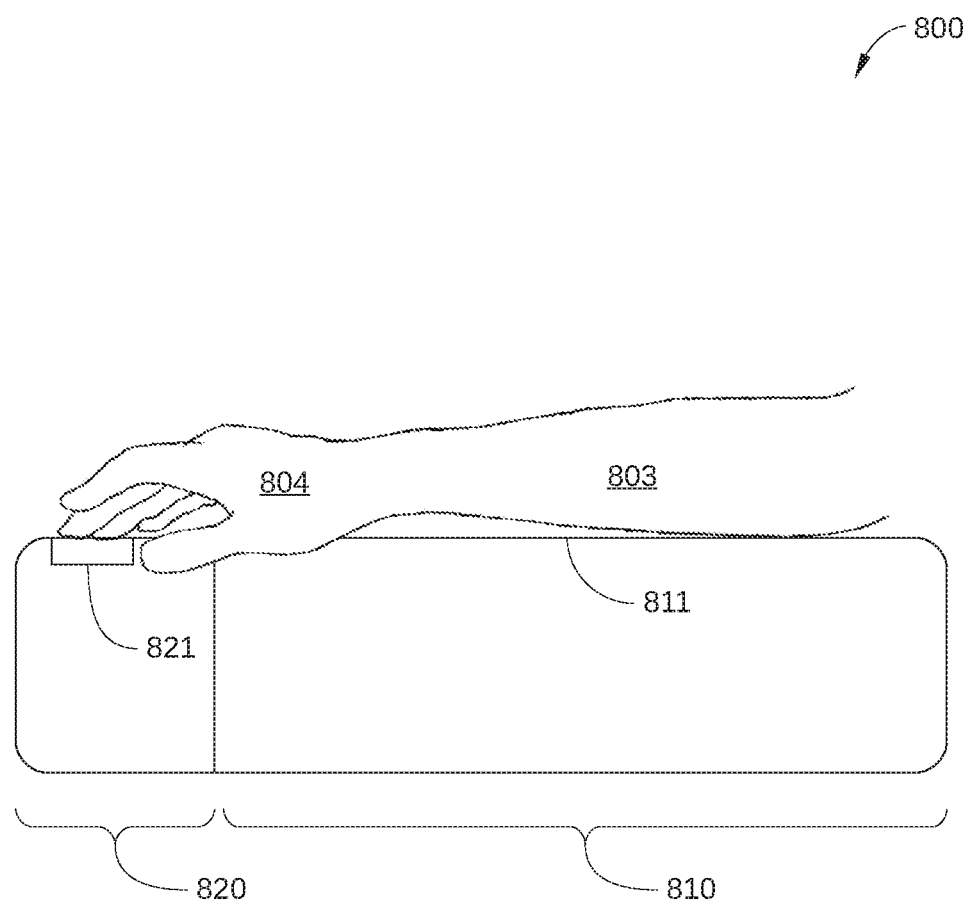
FIG. 8 schematically illustrates a proprioceptive I/O device that includes a non-proprioceptive input device, according to an embodiment of the present disclosure.

FIG. 8 schematically illustrates a proprioceptive I/O device 800 that includes a non-proprioceptive input device, according to an embodiment of the present disclosure. Like the embodiments described above, proprioceptive I/O device 800 is configured to generate proprioceptive output via a proprioceptive I/O region 810. Unlike the embodiments described above, proprioceptive I/O device 800 is further configured to receive non-proprioceptive input via non-proprioceptive input device 820. In the embodiment illustrated in FIG. 8, proprioceptive I/O region 810 can be configured to generate proprioceptive output via any technique of the above-described embodiments, while non-proprioceptive input device 820 can be configured with any conventional input device 821. Examples of suitable conventional input devices include a capacitive or other touch-sensitive surface, one or more mechanical input devices (such as a roller ball and/or mechanical buttons), and the like. In some embodiments, conventional input device 821 is activated in response to proprioceptive I/O region 810 generating proprioceptive output. In other embodiments, conventional input device 821 is activated throughout normal operation of an autonomous vehicle that includes proprioceptive I/O device 800.

In the embodiment illustrated in FIG. 8, proprioceptive I/O device 800 is configured to receive a forearm 803 of an occupant of an autonomous vehicle on a surface 811 associated with proprioceptive I/O region 810. Thus, proprioceptive I/O device 800 has an arm rest configuration. In such an embodiment, non-proprioceptive input device 820 is configured to receive non-proprioceptive input from a hand 804 and/or fingers of forearm 803. In other embodiments, proprioceptive I/O region 810 can be configured to generate proprioceptive output for and receive proprioceptive input from a different occupant body part. Further, non-proprioceptive input device 820 can be configured to receive input from any other body of an occupant besides hand 804 or fingers of an occupant as shown in FIG. 8.

Figure 9:
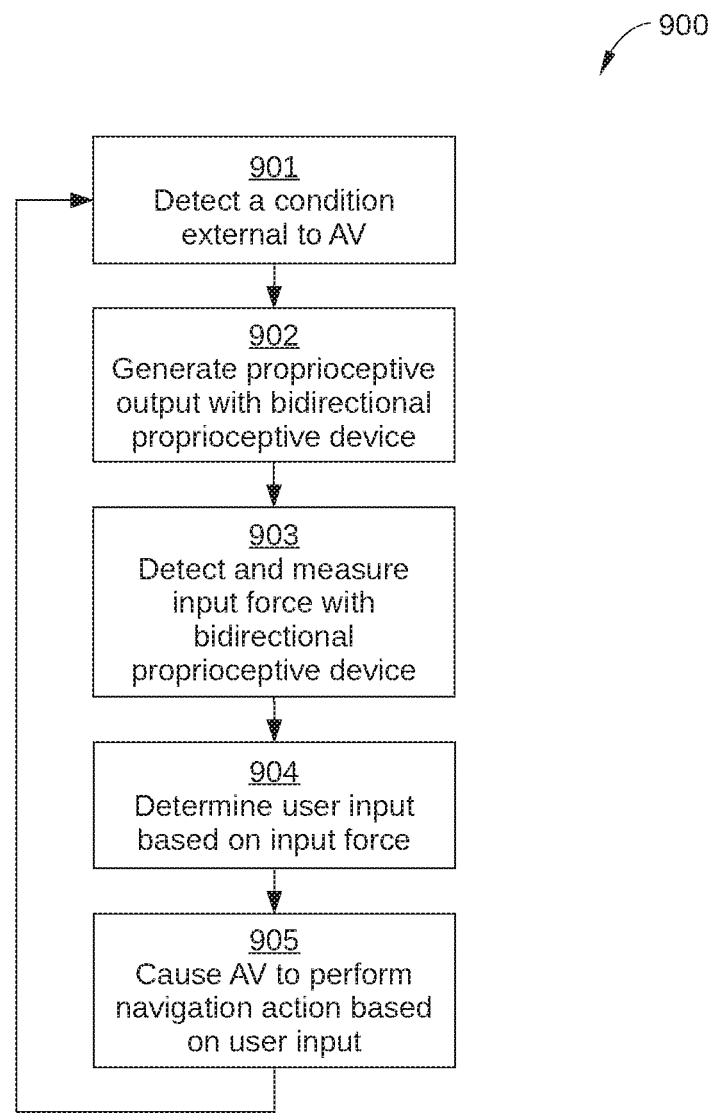
FIG. 9 is a flowchart of method steps for proprioceptive interactions with an autonomous vehicle, according to various embodiments of the present disclosure.

FIG. 9 is a flowchart of method steps for proprioceptive interactions with an autonomous vehicle, according to various embodiments of the present disclosure. Although the method steps are described with respect to the systems of FIGS. 1-8, persons skilled in the art will understand that any system configured to perform the method steps, in any order, falls within the scope of the various embodiments.

As shown, a method 900 begins at step 901, in which an autonomous vehicle 100 detects a condition external to autonomous vehicle 100. For example, the condition can be a wide vehicle that is positioned in a lane adjacent to autonomous vehicle 100 or is predicted to be adjacent to autonomous vehicle 100, where the width and position of the wide vehicle is determined to reduce a clearance between the wide vehicle and autonomous vehicle 100 below a threshold that may be uncomfortable for at least one occupant of autonomous vehicle 100. In another example, the condition can be a vehicle that is detected, has a high speed relative to autonomous vehicle 100 (for example by passing autonomous vehicle 100 or being passed by autonomous vehicle 100), and is positioned in an adjacent lane or the same lane as autonomous vehicle 100.

In step 902, proprioceptive I/O system 120 generates proprioceptive output to an occupant of autonomous vehicle 100 via bidirectional proprioceptive I/O device 210. Generally, bidirectional proprioceptive I/O device 210 changes a shape of at least a surface or a portion of a surface included therein to generate the proprioceptive output. Because bidirectional proprioceptive I/O device 210 communicates the condition to the occupant proprioceptively, the occupant can be made aware of the condition without consulting an infotainment screen or listening for an audible alert.

In step 903, proprioceptive I/O system 120 detects proprioceptive input from the occupant of autonomous vehicle 100. Specifically, the occupant pushes against and/or moves at least a surface or portion of a surface of bidirectional proprioceptive I/O device 210 to generate the proprioceptive input. For example, the occupant may push away from the surface that changes shape in step 902 to indicate that autonomous vehicle 100 should navigate away from the detected condition. Upon detection of the proprioceptive input, proprioceptive I/O system 120 measures an input force associated with the proprioceptive input.

In step 904, proprioceptive I/O system 120 determines a user input based on the input force determined in step 903. Specifically, proprioceptive I/O system 120 determines a particular navigation action (e.g., change the current driving lane, increase following distance, reposition within the current driving lane). Proprioceptive I/O system 120 determines the navigation action based on the location and/or direction of force applied and/or motion caused by the occupant body part in contact with bidirectional proprioceptive I/O device 210. In some embodiments, proprioceptive I/O system 120 determines the particular navigation action further based on the magnitude of force applied and/or magnitude of motion caused by the occupant body part in contact with bidirectional proprioceptive I/O device 210. For example, in some embodiments, force applied by the occupant body part on one or more portions of bidirectional proprioceptive I/O device 210 that correspond to the location of the condition indicates a request for navigation or other movement of autonomous vehicle 100 away from the condition detected in step 901. In such embodiments, a first range of force may indicate a request for navigation of autonomous vehicle 100 to a different portion of the current lane in which autonomous vehicle 100 is traveling and a second range of force may indicate a request for navigation of autonomous vehicle 100 to a different lane than the lane in which autonomous vehicle 100 is currently traveling. In such embodiments, the second range of force is generally greater than the first range of force.

In step 905, in response to the user input determined in step 904, autonomous vehicle 100 performs the navigation action determined in step 904. In some embodiments, proprioceptive I/O system 120 causes bidirectional proprioceptive I/O device 210 to modify the proprioceptive output accordingly as the navigation action is performed. Autonomous vehicle 100 then continues to monitor the surroundings for a condition that may initiate another iteration of method 900.

As discussed above and further emphasized here, FIG. 9 is merely an example which should not unduly limit the scope of the claims. One of ordinary skill in the art would recognize many variations, alternatives, and modifications. In some embodiments, steps 901 and 902 may operate in a first loop and steps 903-905 may operate in a second loop that is performed in parallel with the first loop. In this way, the proprioceptive device may be used to provide different proprioceptive outputs as different conditions external to the autonomous vehicle are detected independently of use of the proprioceptive device to detect and provide navigation actions based on input forces.

In sum, various embodiments set forth systems and techniques for interacting with an autonomous vehicle. In the embodiments, a bidirectional I/O device is configured for use in an autonomous vehicle to convey information to an occupant regarding one or more conditions external to the autonomous vehicle via the proprioceptive sense of the occupant. The bidirectional I/O device is further configured to receive input from the occupant to perform a targeted navigation action, such as modification of lane position of the autonomous vehicle. Thus, an occupant can be informed of a particular condition external to the autonomous vehicle and modify the behavior of the autonomous vehicle in response to the particular condition according to the personal preference of the occupant.

At least one technological improvement of the disclosed embodiments is that an occupant of an autonomous vehicle can proprioceptively receive, via a proprioceptive I/O device, output from the autonomous vehicle that indicates a condition detected external to the autonomous vehicle. Further, the occupant can provide input to the autonomous vehicle via the proprioceptive device to cause the autonomous vehicle to perform a navigation action, such as modifying the current lane position of the autonomous vehicle. Thus, an occupant of an autonomous vehicle can receive information regarding a condition external to the autonomous vehicle without consulting a display screen, and can modify operation of the autonomous vehicle in response to the condition without visually searching for the proprioceptive I/O device.

1. In some embodiments, a system for interactions with an autonomous vehicle includes: a proprioceptive device; and a controller configured to: detect a first condition external to the autonomous vehicle; generate a first proprioceptive output in response to the first condition, the first proprioceptive output changing a shape of the proprioceptive device; receive a first input force from the proprioceptive device; determine a first user input based on the first input force; and based on the first user input, cause the autonomous vehicle to perform a navigation action.

2. The system of clause 1, wherein the controller is further configured to: detect a change of the first condition to a second condition external to the autonomous vehicle, wherein the change to the second condition is caused by performance of the navigation action; and generate a second proprioceptive output in response to the second condition, the second proprioceptive output changing the shape of the proprioceptive device.

3. The system of clause 1 or 2, further comprising a surface configured to support a body part.

4. The system of any of clauses 1-3, wherein the proprioceptive device comprises a plurality of movable elements proximate the surface.

5. The system of any of clauses 1-4, wherein the plurality of movable elements includes one or more first movable elements and one or more second movable elements, and wherein the surface is disposed between the one or more first movable elements and the one or more second movable elements.

6. The system of any of clauses 1-5, further comprising a sensor configured to determine a size of the body part when disposed on the surface.

7. The system of any of clauses 1-6, wherein: the proprioceptive device includes one or more first movable elements that are configured to generate the first proprioceptive output; one or more second movable elements that are configured to generate a second proprioceptive output in response to a second condition; and the second proprioceptive output changes a shape of the proprioceptive device.

8. The system of any of clauses 1-7, wherein the controller is further configured to receive a second input force from the one or more second movable elements.

9. The system of any of clauses 1-8, wherein the proprioceptive device includes an actuator configured to generate a first force against or move a first portion of a body part in a first direction.

10. The system of any of clauses 1-9, wherein the proprioceptive device further includes a sensor configured to detect the first input force based on one of a pressure against the actuator caused by the first input force or a motion of the actuator caused by the first input force.

11. The system of any of clauses 1-10, wherein the proprioceptive device comprises one or more slider mechanisms, pistons, rotatable flaps, or flexible strips.

12. A method of interacting with an autonomous vehicle, the method comprising: detecting a first condition external to an autonomous vehicle; generating a first proprioceptive output in response to the first condition, the first proprioceptive output changing a shape of a proprioceptive device; receiving a first input force from the proprioceptive device; determining a first user input based on the first input force; and based on the first user input, causing the autonomous vehicle to perform a navigation action.

13. The method of clause 12, wherein generating the first proprioceptive output comprises causing movement of or force against a first portion of a body part in a first direction with a first surface of the proprioceptive device.

14. The method of any of clause 12 or 13, further comprising: detecting a change of the first condition to a second condition external to the autonomous vehicle, wherein the change to the second condition is caused by performance of the navigation action; and generating a second proprioceptive output in response to the second condition, the second proprioceptive output changing the shape of the proprioceptive device.

15. The method of any of clauses 12-14, further comprising determining a size of a body part when disposed on a surface disposed between one or more first moveable elements of the proprioceptive device and one or more second moveable elements of the proprioceptive device.

16. The method of any of clauses 12-15, further comprising generating a second proprioceptive output in response to a second condition, the second proprioceptive output changing a shape of the proprioceptive device.

17. The method of any of clauses 12-16, further comprising receiving a second input force from the proprioceptive device.

18. A non-transitory computer readable medium storing instructions that, when executed by a processor, cause the processor to perform the steps of: detecting a condition external to an autonomous vehicle; generating a first proprioceptive output in response to the condition, the first proprioceptive output changing a shape of a proprioceptive device; receiving a first input force from the proprioceptive device; determining a first user input based on the first input force; and based on the first user input, causing the autonomous vehicle to perform a navigation action.

19. The non-transitory computer readable medium of clause 18, wherein changing a shape of the proprioceptive device comprises moving one or more moveable elements of the proprioceptive device.

20. The non-transitory computer readable medium of clause 18 or 19, wherein the condition external to the autonomous vehicle comprises at least one of a vehicle having a speed relative to the autonomous vehicle that exceeds a threshold value and an object disposed outside a navigation path of the autonomous vehicle so that a predicted separation between the object and the autonomous vehicle is less than a threshold value.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A system for interactions with an autonomous vehicle, the system comprising:
   a proprioceptive device; and
   a controller configured to:
      detect a first condition external to the autonomous vehicle;
      generate a first proprioceptive output for a user in response to the first condition, the first proprioceptive output exerting an output force on the user using a first portion of the proprioceptive device that is located closest to the first condition external to the autonomous vehicle;
      detect an input force that pushes away in a direction that opposes the output force exerted by the first proprioceptive output, the input force being due to movement of the user, and the input force indicating a direction of a navigation action of the autonomous vehicle; and
      cause the autonomous vehicle to perform the navigation action.

2. The system of claim 1, wherein the controller is further configured to:
   detect a change of the first condition to a second condition external to the autonomous vehicle, wherein the change to the second condition is caused by performance of the navigation action; and
   generate a second proprioceptive output in response to the second condition, the second proprioceptive output exerting a second force on the user using a second portion of the proprioceptive device.

3. The system of claim 1, further comprising a surface configured to support a body part.

4. The system of claim 3, wherein the proprioceptive device comprises a plurality of movable elements proximate the surface.

5. The system of claim 4, wherein the plurality of movable elements includes one or more first movable elements and one or more second movable elements, and wherein the surface is disposed between the one or more first movable elements and the one or more second movable elements.

6. The system of claim 3, further comprising a sensor configured to determine a size of the body part when disposed on the surface.

7. The system of claim 1, wherein:
   the proprioceptive device includes one or more first movable elements that are configured to generate the first proprioceptive output;
   one or more second movable elements that are configured to generate a second proprioceptive output in response to a second condition; and
   the second proprioceptive output exerting a second force on the user using a second portion of the proprioceptive device.

8. The system of claim 1, wherein the proprioceptive device includes an actuator configured to generate a first force against or move a first portion of a body part in a first direction.

9. The system of claim 8, wherein the proprioceptive device further includes a sensor configured to detect the input force based on one of a pressure against the actuator caused by the input force or a motion of the actuator caused by the input force.

10. The system of claim 1, wherein the proprioceptive device comprises one or more slider mechanisms, pistons, rotatable flaps, or flexible strips.

11. The system of claim 1, wherein the controller is further configured to determine whether to generate the first proprioceptive output by comparing the first condition with a preference of the user.

12. The system of claim 1, wherein the controller causes the autonomous vehicle to determine the navigation action based on a preference of the user.

13. A method of interacting with an autonomous vehicle, the method comprising:
   detecting a first condition external to an autonomous vehicle;
   generating a first proprioceptive output for a user in response to the first condition, the first proprioceptive output exerting an output force on the user using a first portion of a proprioceptive device that is located closest to the first condition external to the autonomous vehicle;
   detecting an input force that pushes away in a direction that opposes the output force exerted by the first proprioceptive output, the input force being due to movement of the user, and the input force indicating a direction of a navigation action of the autonomous vehicle; and
   causing the autonomous vehicle to perform the navigation action.

14. The method of claim 13, wherein generating the first proprioceptive output comprises causing movement of or force against a first portion of a body part in a first direction with a first surface of the proprioceptive device.

15. The method of claim 13, further comprising:
   detecting a change of the first condition to a second condition external to the autonomous vehicle, wherein the change to the second condition is caused by performance of the navigation action; and
   generating a second proprioceptive output in response to the second condition, the second proprioceptive output exerting a second force on the user using a second portion of the proprioceptive device.

16. The method of claim 13, further comprising determining a size of a body part when disposed on a surface disposed between one or more first moveable elements of the proprioceptive device and one or more second moveable elements of the proprioceptive device.

17. The method of claim 13, further comprising generating a second proprioceptive output in response to a second condition, the second proprioceptive output exerting a second force on the user using a second portion of the proprioceptive device.

18. A non-transitory computer readable medium storing instructions that, when executed by a processor, cause the processor to perform the steps of:
   detecting a condition external to an autonomous vehicle;
   generating a first proprioceptive output for a user in response to the condition, the first proprioceptive output exerting an output force on the user using a first portion of a proprioceptive device that is located closest to the condition external to the autonomous vehicle;
   detecting an input force that pushes away in a direction that opposes the output force exerted by the first proprioceptive output, the input force being due to movement of the user, and the input force indicating a direction of a navigation action of the autonomous vehicle; and
   causing the autonomous vehicle to perform the navigation action.

19. The non-transitory computer readable medium of claim 18, wherein exerting the output force on the user using the first portion of the proprioceptive device comprises moving one or more moveable elements of the proprioceptive device.

20. The non-transitory computer readable medium of claim 18, wherein the condition external to the autonomous vehicle comprises at least one of a vehicle having a speed relative to the autonomous vehicle that exceeds a threshold speed value or an object disposed outside a navigation path of the autonomous vehicle with a predicted separation between the object and the autonomous vehicle being less than a threshold separation value.

\* \* \* \* \*